S. H. FORD.
Cultivator.

No. 199,634. Patented Jan. 29, 1878.

Witnesses
Martin J. Whitman
N. Cowles

Inventor
Silvanus H. Ford
By Gridley & Sherburne
Attys

UNITED STATES PATENT OFFICE.

SILVANUS H. FORD, OF BEAVER DAM, WISCONSIN.

IMPROVEMENT IN CULTIVATORS.

Specification forming part of Letters Patent No. 199,634, dated January 29, 1878; application filed August 17, 1877.

*To all whom it may concern:*

Be it known that I, SILVANUS H. FORD, of Beaver Dam, in the county of Dodge and State of Wisconsin, have invented new and useful Improvements in Cultivators; and I do hereby declare the following to be a full, clear, and exact description thereof, which will enable others skilled in the art to which my invention appertains to make and use the same, reference being had to the accompanying drawing, forming part of this specification, in which—

Figure 1:
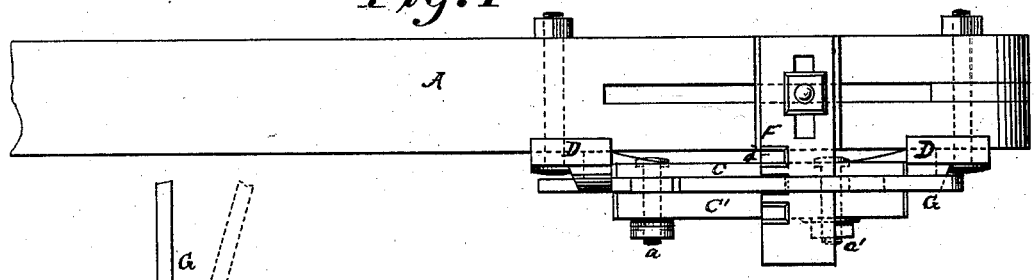
Figure 2:
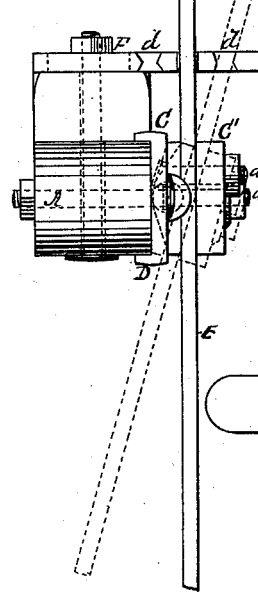
Figure 3:
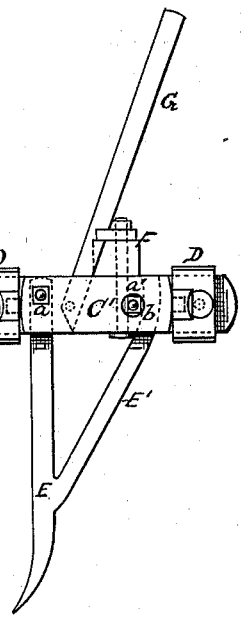

Figure 1 represents a general plan of one of the drag-bars of a cultivator, showing a top view of the parts constituting my said invention. Fig. 2 represents an end view, and Fig. 3 represents a side elevation, of the same.

Like letters of reference indicate like parts.

My invention relates to that class of cultivators employing shovel-standards, so connected to the beam or drag-bar as to slip backward when the shovels are brought in contact with any rigid obstruction, so as to allow the shovels to pass over the same; and the object of my invention is to provide a means of adjusting the shovels to or from the row of plants without changing the position of the drag-bar.

To that end my invention consists in the arrangement of parts, as hereinafter more fully described and claimed.

In the drawing, A represents the beam or drag-bar, which may be constructed in any suitable form, and attached at its front end to the frame-work of the cultivator, in the ordinary manner.

C and C' are clamp-plates, which are secured together by screw-bolts $a$ $a'$, passing laterally through them, as shown in Fig. 1. The clamp-plate C is journaled at its ends in suitable boxes D D, permanently attached to the side of the drag-bar, as shown in Fig. 3, and so as to admit of a slight rocking movement of the plates.

E represents the shovel-standard, which is fulcrumed or secured at its upper end upon the bolt $a$, between the plates C C', and is provided at a point near its lower end with a brace, E', extending backward and upward between the plates, immediately back of the bolt $a'$, as shown in Fig. 3. This brace is curved at its upper end so as to describe the arc of a circle, as shown by dotted lines at C, and is so arranged as to admit of being clamped between the plates by tightening the nuts on the bolts $a$ $a'$, and so as to hold the standard in a working position against the resistance of the soil as the cultivator is moved forward, and so as to allow the brace to slip between the plates, should the shovel come in contact with any rigid obstruction, and thereby allow the standard to move backward, so that the shovel will pass over the obstruction.

F represents a horizontal bracket, which is attached to the upper surface of the beam A, and so as to project laterally therefrom over the clamp-plates, and slightly above the same. This bracket is adjustably secured to the beam, so that it may be moved longitudinally thereon, or transversely across the same, and is provided on its front edge with a series of notches, $d$, as shown in Figs. 1 and 2.

G is an adjusting-lever, which is fulcrumed to the clamp-plates C C', and so as to allow its upper end to be moved forward or backward at will, and so as to cause the lever to enter the notches $d$ in the bracket F, by which means the clamp-plates are held in a fixed position.

The arrangement of this lever, clamp-plates, and shovel-standard is such that when the lever is disengaged from the notches in the bracket it may be moved to the right or left, so as to rock the clamp-plates, and thereby change the position of the shovels toward or from the row of plants, and hold the shovels in a fixed position relative to the row of plants when the lever is moved backward into one of the notches.

I do not limit myself to the use of the rocking clamp in cultivators, as the same may be used to adjust the teeth in seed-drilling machines.

Having thus described my invention, what I claim as new, and desire to secure by Letters Patent, is—

1. The combination, with the beam or drag-bar A and standard E, of the rocking clamp-plates C and C', substantially as and for the purpose specified.

2. The combination, with the rocking clamp-plates C and C', of the lever G and notched bracket F, substantially as and for the purpose specified.

SILVANUS H. FORD.

Witnesses:
CH. HEMMY,
THEO. HEMMY.